United States Patent

Lellmann et al.

[11] Patent Number: 5,561,720
[45] Date of Patent: Oct. 1, 1996

[54] METHOD FOR EXTRACTING INDIVIDUAL CHARACTERS FROM RASTER IMAGES OF A READ-IN HANDWRITTEN OR TYPED CHARACTER SEQUENCE HAVING A FREE PITCH

[75] Inventors: Wolfgang Lellmann, Konstanz; Xaver Müller, Radolfzell, both of Germany

[73] Assignee: CGK Computer Gesellschaft Konstanz mbH, Konstanz, Germany

[21] Appl. No.: 30,480

[22] PCT Filed: Sep. 26, 1991

[86] PCT No.: PCT/EP91/01834

§ 371 Date: Oct. 8, 1993

§ 102(e) Date: Oct. 8, 1993

[87] PCT Pub. No.: WO92/06448

PCT Pub. Date: Apr. 16, 1992

[30] Foreign Application Priority Data

Sep. 27, 1990 [EP] European Pat. Off. ............... 9011613

[51] Int. Cl.[6] ....................................... G06K 9/00
[52] U.S. Cl. ............................. 382/178; 382/187
[58] Field of Search ............... 382/178, 179, 382/187, 198, 199, 203

[56] References Cited

U.S. PATENT DOCUMENTS

| 4,365,234 | 12/1982 | Henrichon, Jr. | 382/178 |
| 4,449,239 | 5/1984 | Bernhardt et al. | 382/9 |
| 4,680,803 | 7/1987 | Dilella | 382/9 |
| 5,040,229 | 8/1991 | Lee et al. | 382/178 |
| 5,253,303 | 10/1993 | Nishijama et al. | 382/178 |
| 5,321,768 | 6/1994 | Fenrich et al. | 382/178 |

FOREIGN PATENT DOCUMENTS

| 0047512 | 3/1982 | European Pat. Off. | G06K 9/34 |
| 0111930 | 12/1983 | European Pat. Off. | G06K 9/62 |

OTHER PUBLICATIONS

Pattern Recognition, "Recognition of Isolated and Simply Connected Hadwritten Numerals", 19 (1986) No. 1, pp. 1–12.

Wiss. Ber. AEG.Telefunken 47 (1974) 3/4 "Bildvorbereitung fur die automatische Zeichenerkennung", pp. 90–99 (not translated).

*Primary Examiner*—Jose L. Couso
*Attorney, Agent, or Firm*—Hill Steadman & Simpson

[57] ABSTRACT

Image-pattern-specific separation values are calculated in each case per column for a separation image of standardized width, with the aid of a separation classifier, and the column having the maximum separation value is defined as the right-hand separation column. On the basis of the separation column predetermined by the separation classifier, an attempt is made, starting from the upper pixel of the separation column, to find a separation path which, in the absence of a white column, is formed within a separation region, which is located on both sides of the separation column, partially by contour tracing and, if no white path can be found by contour tracing, partially by forced separation along the separation column.

3 Claims, 5 Drawing Sheets tr

TW

METHOD FOR EXTRACTING INDIVIDUAL CHARACTERS FROM RASTER IMAGES OF A READ-IN HANDWRITTEN OR TYPED CHARACTER SEQUENCE HAVING A FREE PITCH

BACKGROUND OF THE INVENTION

1. Field of the Invention

The invention relates to a method for extracting individual characters from raster images of a read-in character sequence, and in particular to handwritten or typed character sequences having a free pitch.

2. Description of the Related Art

In the case of automatic character recognition, in the context of raster image conditioning it is necessary, inter alia, to isolate segments which are respectively associated with an individual character from the read-in character sequence. As long as the raster images of individual characters are intrinsically cohesive and are bounded on both sides by white regions, such as white columns or white paths, the extraction of the individual characters presents no particular difficulties. However, this "ideal case" does not exist in the case of closely written handwriting and typing since, in this case, the individual characters often overlap and/or are in contact with one another, which considerably exacerbates separation of the characters, or even makes it completely impossible, because there are no longer any white columns and white paths between the letters. If the writing is only set closer together, but is written with a fixed pitch (i.e. normal typing or handwriting in small pre-printed raster boxes), so-called comb segmenting methods (as disclosed in Wissenschaftliche Berichte [Scientific Reports] A. E. G.-TELEFUNKEN, Volume 47, Number ¾, March 1974, pages 90–99, Berlin, Dr. J. Schürman: "Bildvorbereitung für die automatische Zeichenerkennung" [Image processing for automatic character recognition]) can often be successfully used to estimate the pitch and to find the segmenting columns. However, in principle this is not possible in the case of printed documents which are produced using typewriters having proportional spacing or composing machines, and likewise in the case of free handwriting, for which reason previous character recognition methods cannot process corresponding character strings.

The statistical method disclosed in European Patent Application 0 047 512 admittedly allows such character strings to be separated in principle, but is not of sufficient quality in the case of free handwriting.

SUMMARY OF THE INVENTION

The present invention is now based on the object of ensuring extraction of individual characters from raster images of read-in handwriting and typing, even in the case of individual characters which overlap, interlock or are in contact with one another.

The object is achieved according to the invention by starting from a left-hand separation column, an image line region is extracted from the raster image line by presetting the next reliable right-hand separation column; the image line region is converted using two-dimensional normalization into a normalized image having a fixed predetermined height and a correspondingly matched width; a separation image having a standardized width is produced from the normalized image in such a manner that inversely proportional components of the normalized image are transferred into the separation image in accordance with the ratio of the matched width to the standardized width; with the aid of a separation classifier, image-pattern-specific separation values are calculated in each case per column for the separation image, and the column having the maximum separation value is defined as the right-hand separation column; on the basis of the separation column predetermined by the separation classifier, an attempt is made, starting from the upper pixel of the separation column, to find a separation path which, in the absence of a white column, is formed within a separation region, which is located on both sides of the separation column, partially by contour tracing and, if no white path can be found by contour tracing, partially by forced separation along the separation column. In the case of the method according to the invention, an optimum separation path is defined between in each case two characters. Such a separation path is characterized by global aspects (position of the path in the line) and by local aspects (shape of the separation path). A two-stage method is therefore used. In this case, the first stage is used to position the separation path to be found on the correct column of the line. A statistical method is used for this purpose, as a pattern recognition process having global properties. A base-classifier cascade (see European Patent Application 0 111 930) combined with features of the angular-cut analysis method according to European Patent Application 0 047 512 is suitable, for example, for such a method. This method is now disclosed, using known character combinations of handwriting and typing characters, such that, even in the case of unknown character combinations, it provides a separation column which is as exact as possible just from the statistical properties of the partial-raster image line on which it is based.

This is now used as the starting point in the second stage, in order to define an optimum separation path from the local properties of the characters in the vicinity of the separation column. In this case, a separation path is regarded as being optimum when, on the one hand, it cuts through as few black regions as possible but, on the other hand, is not too far removed from the separation column. A modified contour tracing method allows, for example, in the vicinity of the separation column, the individual character components to be allocated to the left-hand or to the right-hand character. If, in addition, it should be necessary to pass through black regions, for example because two characters are stuck together at one point, this is done on the separation column. An optimum separation path can thus be composed partially from "curved white paths" and partially from separations through black regions.

Advantageous developments of the invention result from the width of the separation region defined on both sides of the separation column being dependent on the height of the raster image line, on the distance of the separation column from the preceding separation column, and on the distance of the separation column from the next reliable separation column.

BRIEF DESCRIPTION OF THE DRAWINGS

The method according to the invention is explained in more detail in the following text using flow diagrams in conjunction with a plurality of raster-image representations, in which.

DETAILED DESCRIPTION OF THE PREFERRED EMBODIMENTS

The individual method steps are numbered successively in the flow diagrams and, in detail, their meanings are as follows.

1) The starting point for the character separation process is a raster image line which is normalized in an oblique position and has a plurality of individual characters which are present as handwriting or typing and, at least partially, overlap one another and/or are in contact with one another.

2) The white column located closest to the left-edge of the first character at the start of the line of the raster-image line is marked as the left-hand separation column $t_1$.

Figure 4:
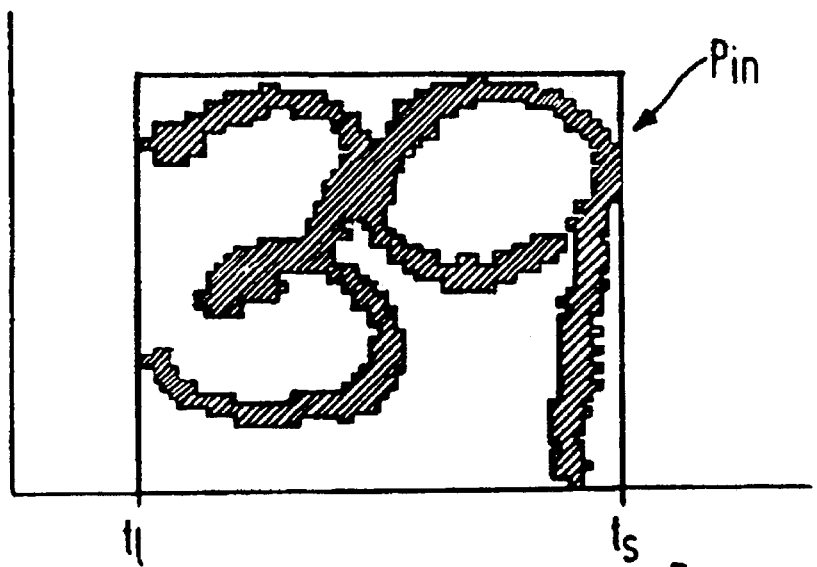

3) A white, or image free, column region occurring in the course of the raster image lines is recognized as the closest reliable right-hand separation column $t_s$ and the image line region $P_{in}$ located between the left-hand separation column $t_1$ and the closest reliable right-hand separation column $t_s$ is extracted (see also FIG. 4).

Figure 5:
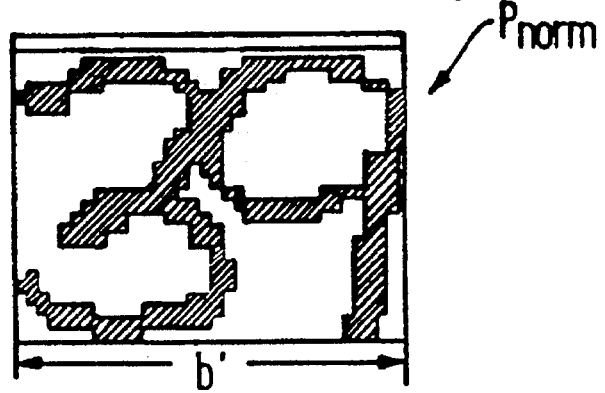

4) The image line region $P_{in}$ is converted using two-dimensional normalization into a normalized image $P_{norm}$ having a fixedly predetermined height and a correspondingly matched width b' (see FIG. 5). In addition, it is investigated whether the normalized image $P_{norm}$ contains more than one character.

5) If the normalized image $P_{norm}$ contains more than one character, a right-hand separation $t_r$ is defined in a coarse separation process, with the aid of a separation classifier. A classifier having, for example, feature formation in accordance with the so-called angular cut analysis method (see European Patent Application 0 047 512) or a basic classifier cascade in accordance with European Patent Application 0 111 930 can be used as the separation classifier. For the case where the normalized image $P_{norm}$ contains only a single character, the coarse separation process is omitted because the closest reliable separation column $t_s$ which has already been determined is automatically defined as the right-hand separation column $t_r$.

6) After determining the right-hand separation column $t_r$, a fine separation process is carried out, in which separation paths $s_1$, $s_r$ are in each case sought in the vicinity of the left-hand and right-hand separation columns $t_1$, $t_r$.

7) The pixel character region lying between the separation paths $s_1$ and $s_r$ is extracted as the individual character raster image $P_{EZ}$.

8) The corresponding significance class is defined for the individual character raster image $P_{EZ}$ in a character classifier.

9) The right-hand separation column $t_r$, determined in method step 6), becomes the new left-hand separation column $t_1'$, by means of which a renewed separation process, starting with method step 3) and a new image line region displaced to the right, is initiated unless the line end of the raster image line is signalled in 10).

Figure 1:
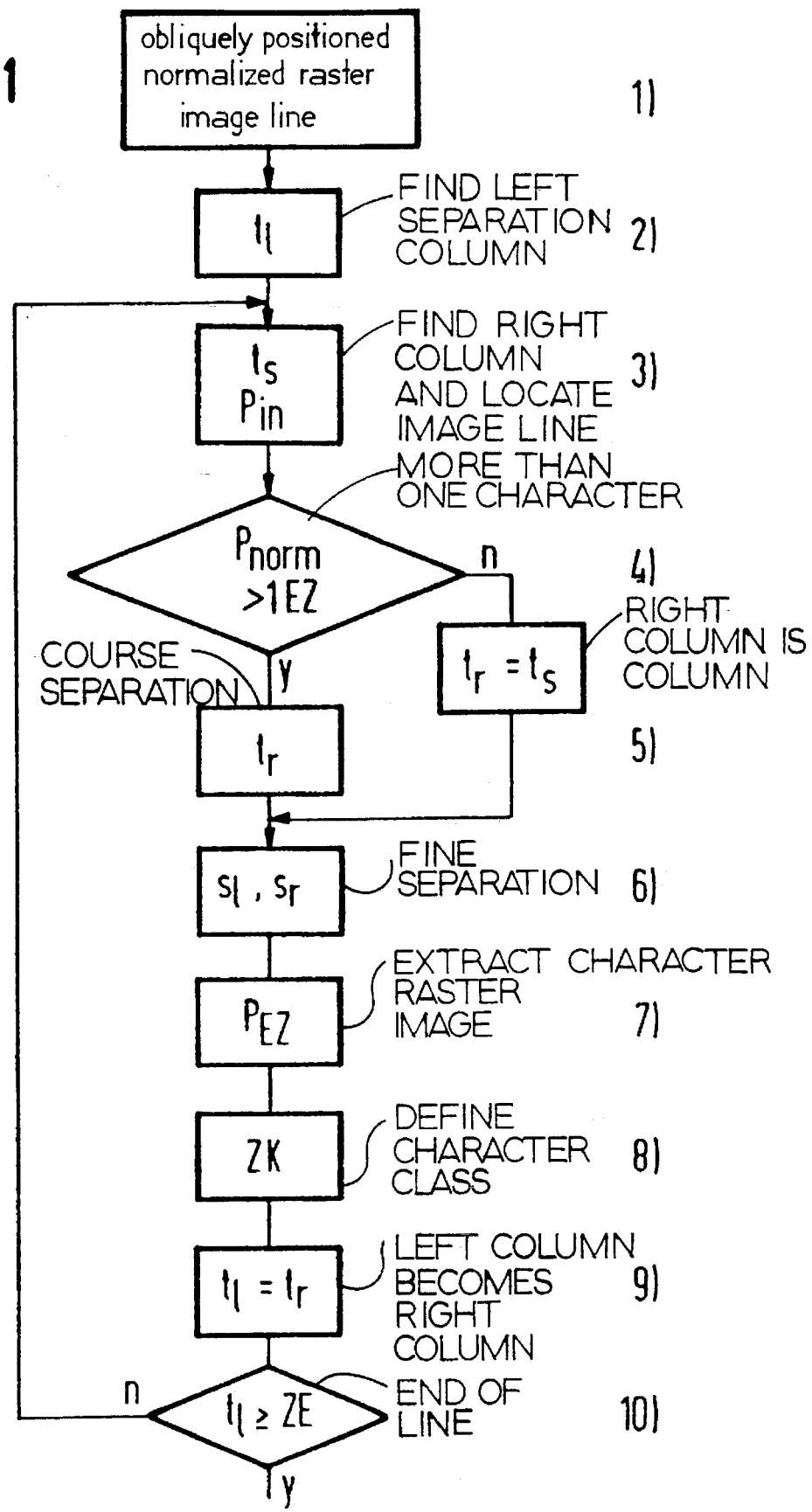
FIG. 1 shows the flow diagram for the complete character separation process according to the invention.
Figure 2:
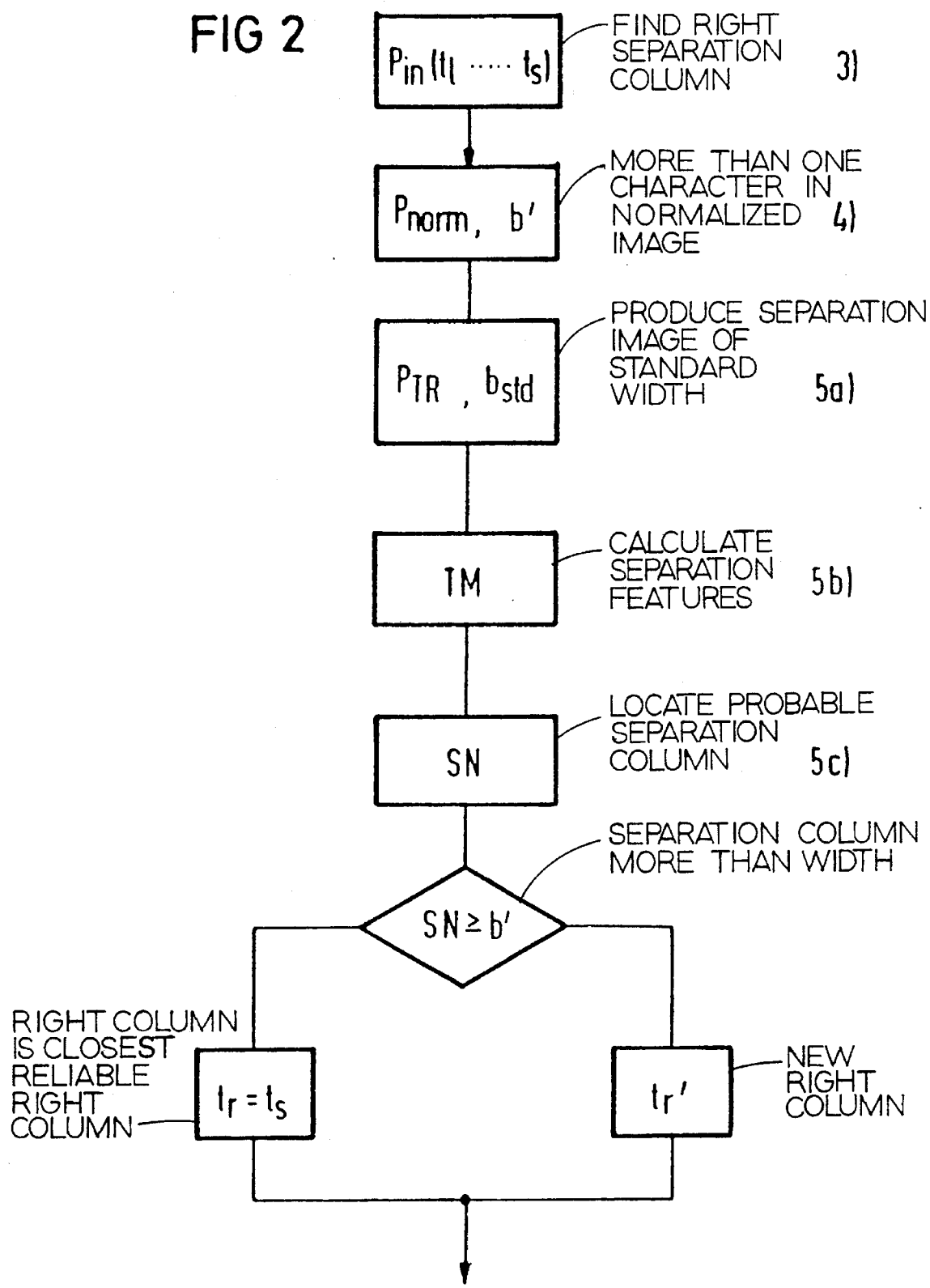
FIG. 2 shows a first subprocess—namely coarse separation—within the process according to FIG. 1.

The coarse separation process in accordance with item 5 is described in the following text, using the flow diagram in FIG. 2.

Figure 6:
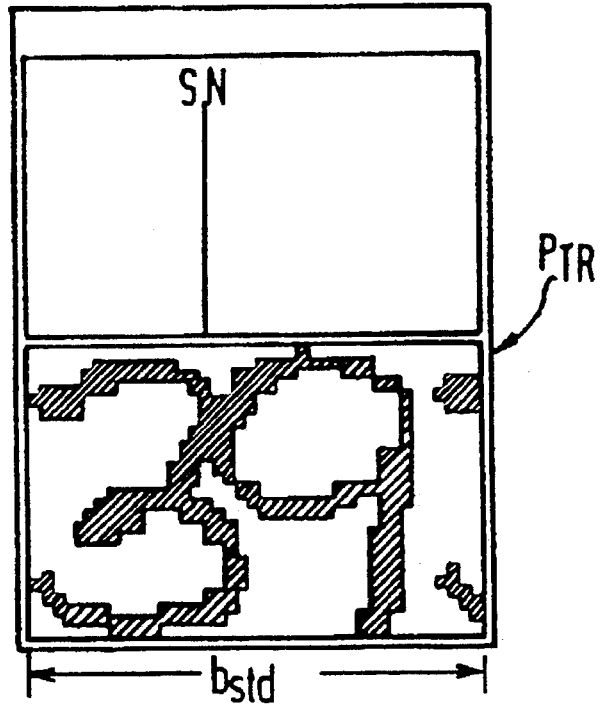

5a) Starting from the normalized image $P_{norm}$, produced in accordance with item 4) and having the width b' (see also FIG. 5), a separation image $P_{TR}$ of standard width $b_{std}$ is produced, which is implemented by cutting off the right-hand edge region $P_{norm}$—if $b' \geq b_{std}$—or—if $b' < b_{std}$ by partial or complete, if necessary multiple, repetition of the normalized image $P_{norm}$. In the example shown in FIG. 6, the standard width $b_{std}$ of the separation image $P_{TR}$ is selected to be somewhat larger than the width b' of the normalized image $P_{norm}$, as a result of which edge regions of the repeatedly represented number "3" can still be recognized at the right-hand edge of the image.

5b) Various separation features TM are calculated from the raster image pattern of the separation image $P_{TR}$ in a separation classifier.

Figure 7:
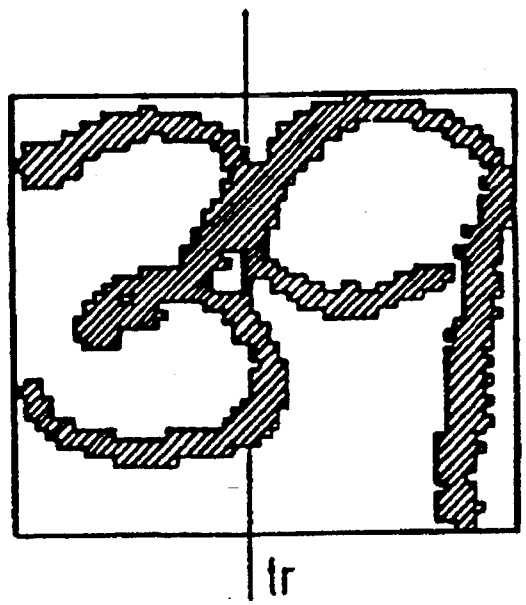

5c) The calculated separation features TM are subjected to a classification algorithm, with the aid of the special separation classifier. A basic classifier cascade, if necessary with additional instruction, can be used, for example, as the separation classifier. The result of this separation classification is a column number SN of the most probable separation column $t_r$ (see FIG. 7). If this probable separation column $t_r$ were actually to be regarded as a possible separation path, then the numbers "3" and "9" in the upper stuck-together region would be cut through at a point which is quite correct, but, on the other hand, parts of the number "3" would be cut off in the lower region and would be allocated to the number "9". A classification of the individual characters, which are partially clipped and partially supplemented by components of other characters, is thus considerably exacerbated, if not made completely impossible.

Figure 3:
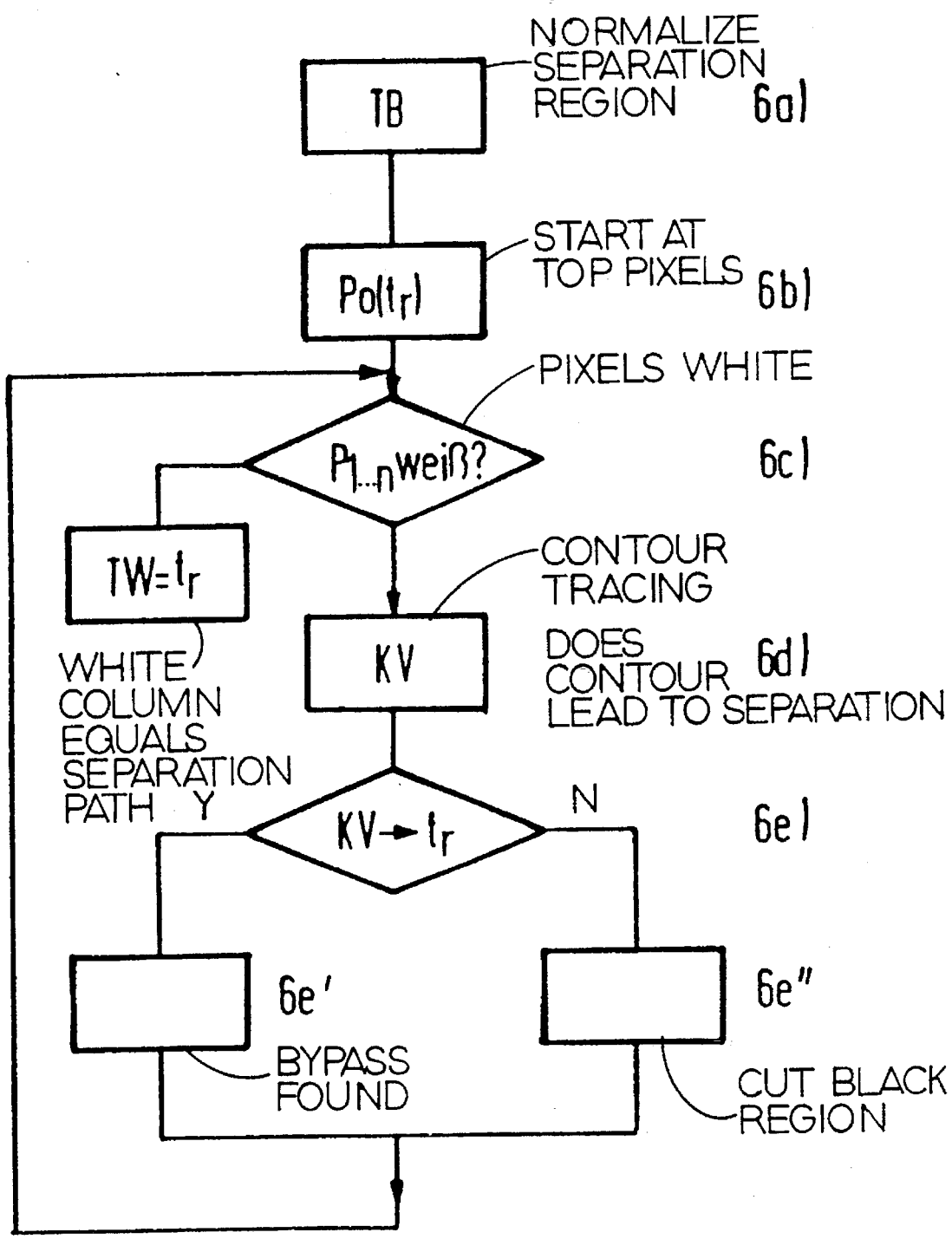
FIG. 3 shows a second subprocess—namely fine separation—within the process according to FIG. 1, FIG. 4 to FIG. 9 show individual raster image presentations in the course of the character separation process.

The following subprocesses result for the fine separation process which follows the coarse separation process and whose flow diagram is shown in FIG. 3, the following starting parameters being taken into account.

I. The raster image line which is normalized in an oblique position and from which the image line region $P_{in}$ which is relevant to the current separation process, is extracted (see FIG. 4).

II. The column number SN of the separation column as a result of the coarse separation process.

III. The distance of the separation column from the preceding separation column.

IV. The distance of the separation column from the next reliable separation column (white path).

6a) A separation region TB, whose width is dependent on the height of the raster image line which is normalized in an oblique position, and on the parameters specified at III. and IV. is defined on both sides of the separation column $t_r$ specified by the coarse separation process.

6b) The top pixel Po of the separation column $t_r$ is used as the starting point for the fine separation process.

6c) A check is carried out to determine whether the following pixels P1 ... n along the separation column are white or not. In the case of a continuous white separation column, this is identical to the complete separation path. The separation process is thus terminated. In the other case, that is to say when the first black pixel occurs along the separation column, the following subprocess is initiated.

6d) An attempt is made to bypass the black region within the separation region specified by 6a)— contour tracing KV.

Figure 8:
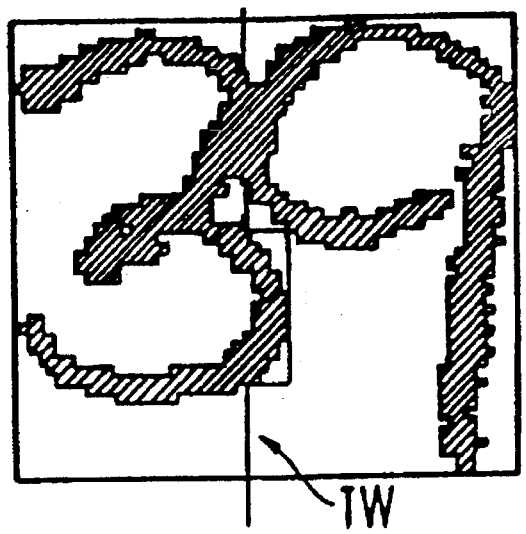

6e) A check is carried out to determine whether the local contour tracing leads back to a lower point of the separation column. If this is the case (6e'), then the bypass path which has been found forms a subsection of the separation path TW. If not (6e"), the black region is cut through along the separation column as far as the first white pixel below this black region. Subprocesses 6c) through 6e) are continued until the lower end of the separation column is reached (see FIG. 8).

Figure 9:
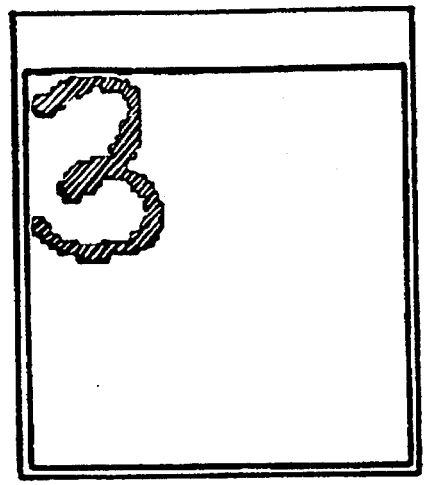

7) The final extraction of the individual character is carried out after completion of the fine separation process (see FIG. 9).

Although other modifications and changes may be suggested by those skilled in the art, it is the intention of the inventors to embody within the patent warranted hereon all changes and modifications as reasonably and properly come within the scope of their contribution to the art.

We claim:

1. A method for extracting individual characters from raster images of a read-in handwritten or typed character sequence having a free pitch, comprising the following method steps:

a) starting from a left-hand separation column between characters, extracting an image line region from a raster image line by presetting a next reliable right-hand separation column between characters;

b) converting an image line region using two-dimensional normalization into a normalized image having a predetermined fixed image height and a correspondingly matched image width;

c) producing a separation image having a standardized width from said normalized image in such a manner that inversely proportional components of said normalized image are transferred into said separation image in accordance with a ratio of said matched width to a standardized width;

d) with the aid of a separation classifier, calculating image-pattern-specific separation values in each case per column for said separation image, and said column having a maximum separation value is defined as a right-hand separation column;

e) on the basis of said separation column predetermined by said separation classifier, an attempt is made, starting from an upper pixel of said separation column, to find a separation path between characters which, in an absence of a white column, is formed within a separation region, which is located on both sides of said separation column, partially by contour tracing and, if no white path can be found by contour tracing, partially by forced separation along said separation column.

2. A method as claimed in claim 1, wherein a width of said separation region defined on both sides of said separation column is dependent on a height of said raster image line, on a distance of said separation column from a preceding separation column, and on a distance of said separation column from a next reliable separation column.

3. A method for extracting individual characters from raster images of a read-in handwritten or typed character sequence having a free pitch, comprising the following method steps:

defining a left-hand separation column in a raster image line;

defining a next reliable right-hand separation column in said raster image line;

starting from said left-hand separation column, extracting an image line region from said raster image line;

converting said image line region using two-dimensional normalization into a normalized image having a predetermined fixed image height and a correspondingly matched image width;

producing a separation image having a standardized width from said normalized image in such a manner that inversely proportional components of said normalized image are transferred into said separation image in accordance with a ratio of said matched width to a standardized width;

with the aid of a separation classifier, calculating image-pattern-specific separation values in each case per column for said separation image, and said column having a maximum separation value is defined as a right-hand separation column; and finding a separation path between characters based on said separation column predetermined by said separation classifier starting from an upper pixel of said separation column, which is formed within a separation region, at least partially by contour tracing and, if no white path is found, partially by forced separation along said separation column.

\* \* \* \* \*